April 28, 1942.
H. S. OGDEN
2,280,841
APPARATUS FOR THE STERILIZATION OF LIQUIDS WITHOUT
THE USE OF HEAT OR CHEMICALS
Filed March 13, 1940
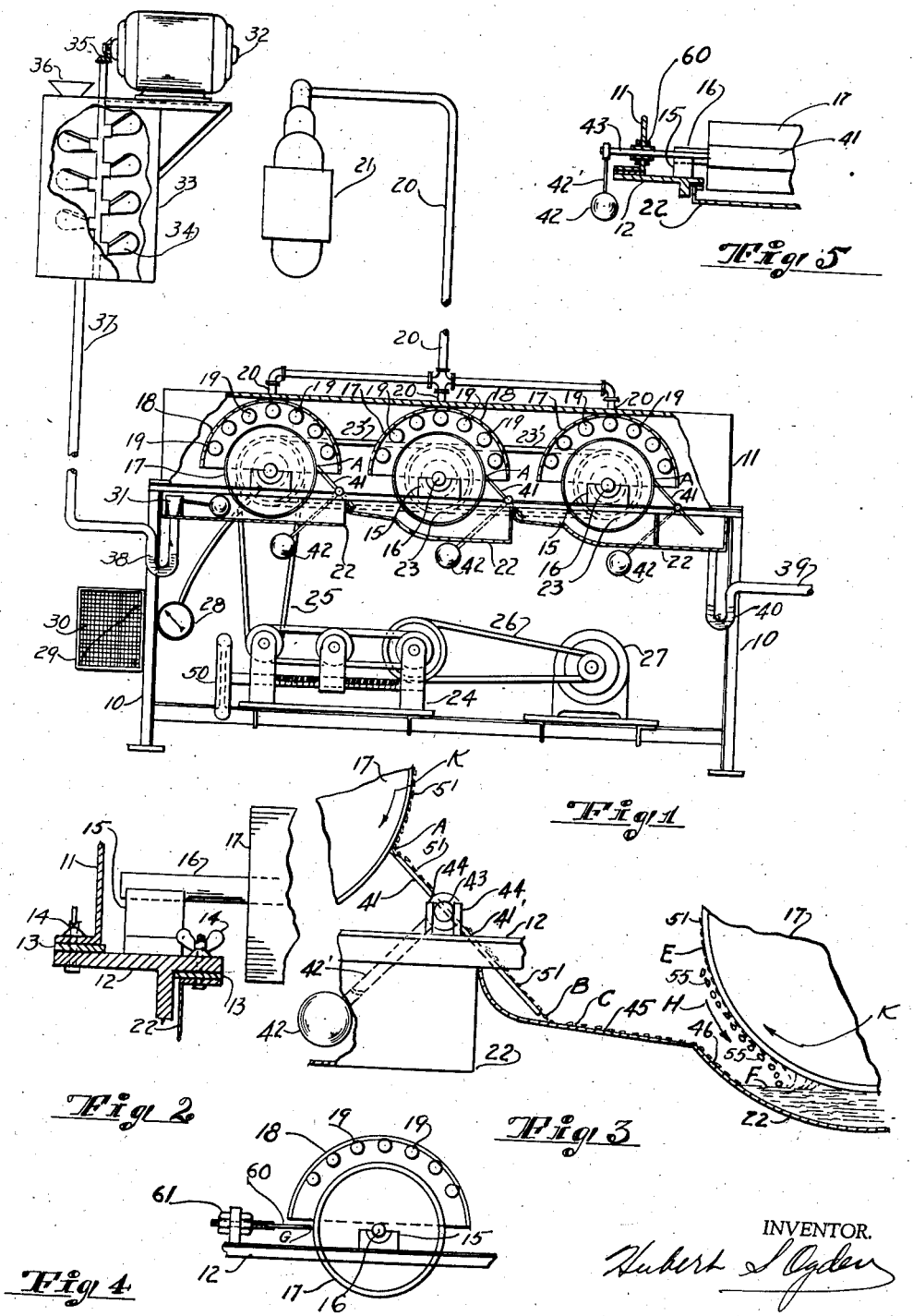
INVENTOR.
Hubert S. Ogden Patented Apr. 28, 1942

2,280,841

UNITED STATES PATENT OFFICE 2,280,841

APPARATUS FOR THE STERILIZATION OF LIQUIDS WITHOUT THE USE OF HEAT OR CHEMICALS

Hubert S. Ogden, Los Angeles, Calif., assignor to Robert M. Vaillancourt, Pasadena, Calif.

Application March 13, 1940, Serial No. 323,772

4 Claims. (Cl. 250—49)

The object of my process is to sterilize liquids, especially those that are subject to human consumption. Such liquids, in their raw state, have a large bacterial content commonly designated as a plate count. They furthermore provide, if not sterilized by some means, a natural incubating media. Sterilization of liquids, especially those used for human consumption, is usually accomplished by raising the temperature of the liquid to a point where the bacteria is destroyed. This process on a commercial scale is unsatisfactory for the reason that absolute control of the plate count cannot be consistently maintained unless excessive temperatures are used. An absolute negative plate count cannot be obtained without destroying in part the vitamin content of the liquid. Calcium in the liquid when subjected to the heat of sterilization becomes difficult to assimilate by the human digestive system. The flavor of the liquid is affected. It is usually desirable to refrigerate the liquid for storage, thus sterilization by heating affects the economy of the process.

A further object of my process is to sterilize liquids without the application of heat or chemicals. Another purpose of my process is to provide a means for the cold sterilization of liquids that is readily controlled to the end that the desired plate count can be absolutely maintained. Another purpose of my process is to sterilize liquids without contaminating the liquid by ozone or other chemical odors. Another purpose of my process is to provide a means for the efficient distribution of the sterilizing agent. Another purpose of my process is to sterilize liquids in such a manner that the flow of the liquids through the apparatus of my process is at a definite and predetermined rate, the rate of flow being governed by the density of the liquids, the intensity of the sterilizing agent and the desired final plate count, each being mathematically dependent upon the other, thereby reducing the element of error commonly caused by faulty judgment of the operator.

I have conducted numerous experiments with my process and apparatus, using water, milk, raw fruit and raw vegetable juices, with equally satisfactory results. For the purpose of this specification I have chosen to demonstrate my process by referring to milk as the liquid to be sterilized. However, it is not to be construed that milk is the only liquid my process will sterilize. Any liquid can be substituted for the milk referred to in the specification.

Briefly, my process consists of forming a film of the liquid to be sterilized on a moving surface and directing ultra violet rays through the film for a period of time that may be determined by the desired plate count, by the intensity of the rays, by the density of the liquid or by all three of the foregoing factors.

I have tried several methods of creating a film of the liquid to be sterilized but have found that the most satisfactory results are obtained if the liquid is passed through the apparatus described in the accompanying drawing. Like characters will be used to denote like and corresponding parts throughout the several views.

Figure 1 is a side view of the apparatus used in my process and is partly cut away.

Figure 2 is a section taken at random through the frame to show one method of creating a gas tight seal.

Figure 3 is a more detailed view of a portion of the apparatus showing the method of transferring the liquid between the cylinders and the shape of the foam eliminating pans.

Figure 4 is a partial view of the auxiliary film regulating means.

Figure 5 is one method of passing the scraper supporting shaft through the gas tight enclosing hood.

Referring more particularly to the drawing 10 is the supporting frame, 11 is a gas tight enclosing hood sealed against 12 a member of the supporting frame by means of sealing material 13 and wing nut 14. Supported on member 12 is a half bearing 15 in which is journalled shaft 16 of closed cylinder 17. Within the gas tight enclosing hood 11 and supported thereby are semicylindrical reflectors 18 which in turn support violet ray tubes 19—19. Violet ray tubes 19—19 are connected through the usual high tension transformers, not shown, to a source of electric current. Passing through the gas tight enclosing hood 11 and cylindrical reflectors 18 and entering the space encompassed by cylindrical reflectors 18 are gas supply lines 20. Gas supply lines 20 are in turn connected to a source of inert gases. I have chosen to show a carbon dioxide generator 21 as the source of the inert gas but other inert gases such as helium, argon, Freon or nitrogen may be used. Sealed against and supported by member 12 of frame 10 are pans 22. 23 is the cylinder rotating means. In this instance I chose to show the cylinder rotating means as a V belt and pulley drive, however, chain, worm and pinion, gear or other drives may be used. 23' is the connecting V belt. 24 is a variable speed device of the expanding sheave type, however, other variable speed means may be used. 25 is a V belt from the variable speed device to the cylinder rotating means 23. 26 is a V belt from the variable speed device to the driving motor 27. 28 is a direct reading tachometer mounted on the supporting frame 10 adjacent to the control 50 of the variable speed device 24. 29 is a frame fixed to supporting frame 10 adjacent to tachometer 28. 30 is a chart mounted on frame 29. 31 is a liquid level regulating means here shown as the floating ball type. 32 is an electric motor mounted on supply tank 33 and connected to agitator shaft and paddles 34 through bevel gear 35. 36 is a filling funnel on tank 33. 37 is a supply line from supply tank 33 to initial pan 22. 38 is a trap in supply line 37. 39 is the discharge line leading from final pan 22. 40 is a trap in discharge line 39.

In operation supply tank 33, which may be located at any point higher than the desired liquid level in initial pan 22, is filled through funnel 36 with the liquid to be sterilized, in this instance milk. Motor 32 is set in motion, revolving agitator paddle 34. This produces a uniform density of the liquid. The liquid passes through supply line 37 forming a trap at 38 and then enters initial pan 22, rising therein until the surface of the liquid is in contact with closed cylinder 17. Liquid level device 31 is adjusted to maintain this level. Motor 27 is started, rotating through the variable speed device 24 and drives 23, cylinder 17—17, clockwise as viewed. The arrows K—K head in the direction of rotation. Some of the liquid in pan 22 adheres to the surface of cylinder 17. As the liquid adhering to cylinder 17 tends to move away and upward from the surface of the main body of the liquid it is placed in tension. As the adhesion to the surface of the cylinder is greater than the cohesion of the liquid, the liquid tends to break away from its main body and remain on the surface of the cylinder in a thin film. The thin film of liquid is carried upward and through a bombardment of ultra violet rays from tubes 19—19 that have been electrically excited. The liquid continues through the range of the ultra violet ray bombardment on the surface of cylinder 17 until it reaches position A where it is removed from cylinder 17 by a closely fitted scraper 41. Scraper 41 is held against cylinder 17 by the action of weight 42 through shaft 42' which is fixed to scraper 41 by means of shaft 43. Scraper 41 is supported on frame member 12 by means of shaft 43 and pins 44—44. The liquid removed from cylinder 17 by scraper 41 flows down the inclined surface 41' of scraper 41 until it reached gap B. Gap B is a small space between the lower end of scraper 41 and surface C of inclined portion 45 of intermediate pans 22—22. Gap B is just sufficiently large to permit a free movement of scraper 41. The liquid in flowing from scraper 41 to pan 22 by means of the small gap B and inclined surface of portion 45 has a very gentle action and does not form a froth or foam. As the liquid continues to flow to pan 22 it passes over curved surface 46 which tends to cause a turbulent action in the liquid, having the effect of inverting the surface of the liquid. The liquid passes through each subsequent violet ray bombardment in a manner similar to that already described for the initial cylinder. Inasmuch as experiment has proven that the sterilizing effect of ultra violet ray bombardment is as effective as the intensity of the ray, the depth of the liquid or the time that the liquid is exposed to the rays, by multiplying the number of cylinders and the corresponding violet ray tubes any degree of sterilization will be attained. As the length of exposure also determines the degree of sterility, and as the length of exposure can be governed by the speed of rotation of cylinders 17—17, tachometer 28 is used to indicate the speed of rotation and chart 30 to indicate the degree of sterility at any given speed. Thus the rate of rotation or degree of sterility is regulated by means of the variable speed device. For example, the chart can be made to read in terms of revolution per minute as one ordinate and plate count as the other ordinate, or, pints per minute as one ordinate and plate count the other ordinate. For instance, milk with a desired final plate count of 1,100 would be the equivalent of operating the apparatus at 40 revolutions per minute or discharging 1½ gallons per minute, or for a desired final plate count of 500 would be the equivalent of 30 revolutions per minute or 1 gallon per minute, or for a desired final plate count of 300 would be the equivalent of 25 revolutions per minute or 3 pints per minute. Thus it can be seen that a chart can be made to enable a direct setting of the speed of the apparatus relative to the final plate count and once that setting is made no further adjustments are necessary.

Inasmuch as the intensity of the ultra violet rays vary inversely as the square of the distance from the source to the objective I have found through experiment that the semicylindrically shaped reflector and tube support 18 is most efficient, as by this arrangement the center lines of all the tubes 19—19 are equi-distant from the surface of the closed cylinder 17.

After the liquid to be sterilized has passed over the several cylinders 17—17 and has been removed from the final cylinder 17 by the final scraper 41 into final pan 22, it is discharged therefrom by means of discharge line 39. Trap 40 formed by the discharging liquid is beneficial in retaining the inert gas within the apparatus.

51—51 are particles of the liquid as they pass from one cylinder to another, and are to be considered for the sake of discussion as separated particles of the liquid forming by close adhesion to each other a continuous film. I have found by experiment that as the liquid is carried upward on the surface E of cylinder 17 some of the particles of the liquid break away from the main mass or film and travel downward over the film back to the surface F of the liquid in pan 22. Arrow H indicates the direction of the returning particles of the liquid. These returning particles marked 55, have a turbulence producing action which further tends to improve the penetration of the ultra violet ray into the liquid. Because of this return flow action of some of the particles, the thickness of the film of the liquid on the surface of cylinder 17 can be readily controlled by varying the rate of rotation of cylinder 17. An auxiliary film thickness adjustment plate 60 is mounted on screw adjusting means 61 and set against the upward moving side of cylinder 17. This provides an additional means of controlling the thickness of the liquid film. It is useful in such instances where a heavier or more viscous liquid may be introduced into the apparatus for sterilization. Advancing or withdrawing adjusting plate 60 influences the thickness of the film of the liquid before it passes through the violet ray bombardment by increasing or decreasing gap G.

I have found that by surrounding the violet ray tubes with an inert gas and driving such free air as may be in the apparatus from under the cylindrical reflectors 18 I can prevent the formation of ozone which contaminates milk to the taste.

In reducing the invention to practice I reserve the right to make such modifications in method and design as may lay within the scope of what I claim.

What I claim is:

1. In an apparatus for the sterilization of liquids without the use of heat or chemicals, wherein a liquid is passed through an apparatus comprising a source of ultra violet rays the said rays being directed to the upper peripheral surface of a closed cylinder, the lower peripheral surface of the cylinder held in contact with the liquid, a pan holding the liquid beneath the cylinder, to the end that foaming be eliminated, the said pan having a gently sloping portion immediately beneath the point where liquid is admitted to the pan and a gently curved surface leading from the lower end of the gently sloping portion to the bottom of the aforesaid pan.

2. In an apparatus for the sterilization of liquids by means of ultra-violet rays, a semi-cylindrical hood encompassing a cylinder, the said hood supporting a multiplicity of ultra-violet ray tubes, the said tubes so mounted within the said hood that the longitudinal axis of the said tubes be parallel to the axis of the said cylinder, and as close to the cylinder as is practical, the said hood so shaped as to parallel the cylinder, the said tubes so arranged as to follow the outline of the cylinder, to the end that the major portion of the surface of the cylinder simultaneously receive a uniform exposure of the ultra-violet rays.

3. In an apparatus for the sterilization of liquids by means of ultra-violet rays, a cylinder, a hood encompassing said cylinder, a multiplicity of ultra-violet ray tubes mounted within said hood so that the longitudinal axis of said tubes parallels the longitudinal axis of said cylinder, and as close to the cylinder as practical, said hood paralleling said cylinder, the said tubes so arranged as to closely follow the outline of the cylinder, to the end that the exposed surface of the cylinder simultaneously receives a uniform exposure to the ultra-violet rays.

4. In an apparatus for the sterilization of liquids by means of ultra-violet rays, a cylinder, a curved reflecting surface having its axis coincident with the axis of said cylinder, a multiplicity of ultra-violet ray tubes mounted between said reflecting surface and the surface of said cylinder to be irradiated so that the longitudinal axis of said tubes parallels the longitudinal axis of said cylinder, said tubes so arranged as to follow closely the curvature of said cylinder, to the end that said surface of the cylinder simultaneously receives a uniform exposure to the ultra-violet rays.

HUBERT S. OGDEN.